(12) United States Patent
Suenaga et al.

(10) Patent No.: US 11,773,985 B2
(45) Date of Patent: Oct. 3, 2023

(54) VALVE DEVICE

(71) Applicant: ASAHI YUKIZAI CORPORATION, Nobeoka (JP)

(72) Inventors: Hiroshi Suenaga, Nobeoka (JP); Kenro Yoshino, Nobeoka (JP)

(73) Assignee: ASAHI YUKIZAI CORPORATION, Nobeoka (JP)

( * ) Notice: Subject to any disclaimer, the term of this patent is extended or adjusted under 35 U.S.C. 154(b) by 0 days.

(21) Appl. No.: 17/638,608

(22) PCT Filed: Aug. 28, 2020

(86) PCT No.: PCT/JP2020/032662
§ 371 (c)(1),
(2) Date: Feb. 25, 2022

(87) PCT Pub. No.: WO2021/039984
PCT Pub. Date: Mar. 4, 2021

(65) Prior Publication Data
US 2022/0325802 A1 Oct. 13, 2022

(30) Foreign Application Priority Data

Aug. 30, 2019 (JP) .................................. 2019-158708

(51) Int. Cl.
*F16K 1/42* (2006.01)
*F16K 1/36* (2006.01)
(Continued)

(52) U.S. Cl.
CPC .................. *F16K 1/42* (2013.01); *F16K 1/36* (2013.01); *F16K 7/16* (2013.01); *F16K 17/04* (2013.01); *F16K 31/126* (2013.01)

(58) Field of Classification Search
CPC ... F16K 1/42; F16K 1/36; F16K 1/485; F16K 7/16; F16K 7/17; F16K 7/12; F16K 17/04; F16K 31/126; F16K 31/1221
See application file for complete search history.

(56) References Cited

U.S. PATENT DOCUMENTS 6,092,782 A * 7/2000 Yamada .................. F16K 23/00
222/571
7,322,557 B2 * 1/2008 Nagao ................. F16K 27/0236
251/118
(Continued)

FOREIGN PATENT DOCUMENTS

CN 105697834 A 6/2016
CN 207989768 U 10/2018
(Continued)

OTHER PUBLICATIONS

PCT/ISA/210, "International Search Report for International Application No. PCT/JP2020/032662," dated Oct. 13, 2020.
(Continued)

Primary Examiner — Patrick C Williams
(74) Attorney, Agent, or Firm — Manabu Kanesaka

(57) ABSTRACT

A valve device includes a valve main body having a valve chamber, and inflow and outflow passages communicating with the valve chamber; an annular valve seat surrounding an opening from the inflow passage to the valve chamber; and a valve element moved to contact with and separate from the valve seat. One of the valve seat and the valve element includes a contact surface, and the other of the valve seat and the valve element includes an annular raised rib. The rib has at a top thereof an annular sealing part contacting the contact surface to provide sealing between the valve element and the valve seat. The sealing part includes an annular flat surface extending parallel to the contact surface, and two annular inclined surfaces provided adjacent to the
(Continued)

flat surface on both sides and inclined to the flat surface to extend in a direction away from the contact surface.

9 Claims, 12 Drawing Sheets

(51) Int. Cl.
*F16K 7/16* (2006.01)
*F16K 17/04* (2006.01)
*F16K 31/126* (2006.01)

(56) References Cited

U.S. PATENT DOCUMENTS

| | | | |
|---|---|---|---|
| 8,840,082 B2* | 9/2014 | Takeda | F16K 27/0236 |
| | | | 251/63.5 |
| 2006/0174945 A1* | 8/2006 | Maula | F16K 7/14 |
| | | | 137/341 |
| 2007/0145321 A1* | 6/2007 | Lowery | F16K 7/14 |
| | | | 251/331 |
| 2016/0123491 A1* | 5/2016 | Chiba | F16K 31/1221 |
| | | | 156/345.24 |
| 2016/0169396 A1 | 6/2016 | Ishikawa et al. | |
| 2017/0074414 A1 | 3/2017 | Milroy | |
| 2019/0257432 A1 | 8/2019 | Nabei et al. | |

FOREIGN PATENT DOCUMENTS

| | | |
|---|---|---|
| CN | 109312867 A | 2/2019 |
| JP | H02-116070 U1 | 9/1990 |
| JP | 2007-170583 A | 7/2007 |
| JP | 2007-224984 A | 9/2007 |
| JP | 2008-291911 A | 12/2008 |
| JP | 2016-114240 A | 6/2016 |
| JP | 2017-133542 A | 8/2017 |
| JP | 6193955 B | 9/2017 |

OTHER PUBLICATIONS

China National Intellectual Property Administration, "Search Report for Chinese Patent Application 2020800599401," dated Jun. 27, 2023.

* cited by examiner

VALVE DEVICE

RELATED APPLICATIONS

The present application is National Phase of International Application No. PCT/JP2020/032662 filed Aug. 28, 2020, and claims priority from Japanese Application No. 2019-158708, filed Aug. 30, 2019, the disclosure of which is hereby incorporated by reference herein in its entirety.

TECHNICAL FIELD

The present invention relates to a valve device that moves a valve element to come in contact with and separate away from a valve seat for closing/opening.

BACKGROUND ART

Conventionally, in various industries, such as chemical factories, agriculture/fisheries, semiconductor manufacturing fields, liquid crystal manufacturing fields, and food fields, a valve device, configured to move a valve element vertically relative to a valve seat to bring into contact and separate from each other for closing and opening of the flow passage, is used. PTL1 describes a diaphragm valve that is one example of these valve devices.

A diaphragm valve typically includes a valve seat formed around an opening from a flow passage to a valve chamber in a valve main body, and a valve element supported by a diaphragm having an outer edge fixed to the valve main body. A drive unit drives a stem connected to the valve element, thereby moving the valve element in a direction perpendicular to the valve seat to bring the valve element into contact with and separate from the valve seat for closing and opening of the flow passage. In order to enhance sealing performance between the valve element and the valve seat, the valve element typically includes an annular rib provided on the bottom surface thereof facing the valve seat to decrease the contact area between the valve element and the valve seat so that a large surface pressure can be obtained between the valve seat and the valve element even under the action of a relatively small pressing force, as in the valve device (diaphragm valve) disclosed in PTL1.

In the fields requiring high cleanliness, particles generated in the valve device can be a problem. For example, in a process of manufacturing semiconductor wafers, particles, that is, contaminants such as various metals, and polymer compounds may be generated. If such particles remain on or adhere to a semiconductor wafer, they will have a significant impact on the quality. To prevent this, the process of manufacturing semiconductor wafers involves a step of washing the semiconductor wafers with a cleaning liquid. In the case where the annular rib is provided in the bottom area of the valve element that comes in contact with the valve seat, as in the valve device described in PTL1, the rib may be deformed or rubbed when the rib comes in contact with the valve seat, which may generate particles. If the cleaning liquid containing such particles is discharged from the valve device and is used to wash semiconductor wafers, this can cause problems of insufficient washing of semiconductor wafers and thus degrading the cleanliness of the semiconductor wafers. In order to suppress generation of such particles, PTL2, for example, proposes a technique of forming a flat seal surface at a forward end of an annular seal protrusion (that is, a rib) provided on an end surface of a valve element facing a valve seat, and suppressing displacement of the seal surface.

CITATION LIST

Patent Literature

PTL1: Japanese Unexamined Patent Publication No. 2008-291911
PTL2: Japanese Patent Publication No. 6193955

SUMMARY OF THE INVENTION

Technical Problem

Valve devices are used under a variety of fluid pressures. Therefore, when the pressure of the fluid flowing through a valve device is high, the force due to the fluid pressure acting on the valve element in the direction of pushing the valve element away from the valve seat becomes large. As a result, when the drive unit presses the valve element against the valve seat for closing the valve, a force of pressing the valve element against the valve seat to provide sealing between the rib and the valve seat (hereinafter referred to as sealing thrust) decreases, so that the stress (force per unit area) in the direction of pressing the rib against the valve seat decreases, resulting in less deformation of the rib. Accordingly, the displacement of the rib in the lateral direction (in the direction parallel to the valve seat) relative to the valve seat also decreases. In contrast, when the fluid pressure is low, a force due to the fluid pressure acting on the valve element in the direction of pushing the valve element away from the valve seat becomes small. As a result, when the drive unit presses the valve element against the valve seat for closing the valve, the sealing thrust increases, so that the stress in the direction of pressing the rib against the valve seat increases, resulting in more deformation of the rib. Accordingly, the displacement of the rib in the lateral direction relative to the valve seat face also increases. In this way, when the fluid pressure is low, particles are more likely to be generated due to friction between the rib and the valve seat than when the fluid pressure is high. In other words, as the fluid pressure fluctuates, the displacement of the rib fluctuates, causing fluctuations in the number of particles generated.

Accordingly, it is an object of the present invention to solve the above problems existing in the prior art and to provide a valve device which can suppress fluctuations in the number of particles generated even when the fluid pressure fluctuates.

Solution to Problem

In view of the above-described object, the present invention provides a valve device including: a valve main body having formed therein a valve chamber and first and second flow passages being in communication with the valve chamber; an annular valve seat formed in an area surrounding an opening from the first flow passage to the valve chamber; and a valve element having an end face facing the valve seat, the valve element moved by a drive unit to come in contact with and separate away from the valve seat, in which one of the valve seat and the end face of the valve element is provided with a contact surface, and the other of the valve seat and the end face of the valve element is provided with an annular raised rib, the rib having at a top thereof an annular sealing part coming in contact with the contact surface to provide sealing between the end face of the valve element and the valve seat, the sealing part including an annular flat surface extending in parallel with the contact surface, and two annular inclined surfaces provided adjacent to the flat surface on both sides and inclined to the flat surface so as to extend in a direction away from the contact surface, the inclined surface in addition to the flat surface coming in contact with the contact surface as a force of pressing the valve element against the valve seat increases.

In the above valve device, the force due to the fluid pressure acting on the valve element in the direction of pushing the valve element away from the valve seat increases when the fluid pressure is high. Therefore, when the valve is closed, the sealing thrust decreases and the stress (force per unit cross-sectional area) generated at the sealing part of the rib decreases, resulting in less deformation of the rib. Accordingly, the displacement of the rib in the vertical direction (in the direction perpendicular to the contact surface) relative to the contact surface also decreases. As a result, only the flat surface of the sealing part comes in contact with the contact surface, so that the contact area between the sealing part and the contact surface decreases, and thus the contact pressure (surface pressure) of the rib to the contact surface increases. This can secure sufficient sealing performance. In addition, the displacement of the sealing part of the rib in the lateral direction relative to the contact surface also decreases, so that particles are less likely to be generated. In contrast, when the fluid pressure is low, the force due to the fluid pressure acting on the valve element in the direction of pushing the valve element away from the valve seat decreases. Therefore, when the valve is closed, the sealing thrust increases and the stress (force per unit cross-sectional area) generated at the rib increases, resulting in more deformation of the rib. Accordingly, the displacement of the rib in the vertical direction (in the direction perpendicular to the contact surface) relative to the contact surface also increases. As a result, the inclined surfaces, in addition to the flat surface of the sealing part, also come into contact with the contact surface, which increases the contact area between the sealing part and the contact surface compared to the case of high fluid pressure, thus distributing the sealing thrust. Therefore, the stress generated in the rib decreases and the deformation of the sealing part of the rib in the lateral direction relative to the contact surface is suppressed, thereby suppressing the generation of particles.

In one embodiment of the valve device, the rib may be disposed on the valve seat, and the contact surface may be disposed on the end face of the valve element.

In the valve device, it is preferable that each of the inclined surfaces is a flat surface. This allows the contact area between the sealing part and the contact surface to increase when the deformation of the rib increases with the increase in sealing thrust, thereby suppressing the increase in stress generated in the rib.

In one embodiment of the valve device, the valve element may be connected to a tip end of a stem which is driven by the drive unit and moves in a direction of moving toward and away from the valve seat, the stem having a pressing portion at the tip end thereof and exerting a force to press the valve element against the valve seat through the pressing portion. In this case, the pressing portion may be located inside the flat surface of the sealing part as viewed in the direction of movement of the stem, or the pressing portion may be located outside the flat surface of the sealing part as viewed in the direction of movement of the stem. In the former case, the inner inclined surface located on the inner side of the flat surface, which is near the point of action of the force from the pressing part to the valve element, is more likely to come into contact with the contact surface. In the latter case, the outer inclined surface located on the outer side of the flat surface, which is near the point of action of the force from the pressing part to the valve element, is more likely to come into contact with the contact surface.

Preferably, in the valve device, each of the inclined surfaces extends at an angle of inclination ranging from 1° to 10° relative to the flat surface in the direction away from the contact surface.

In the valve, the valve device may further include a diaphragm extending radially outward from the outer periphery of the valve element, and the valve element may be supported by the valve main body via the diaphragm.

The drive unit may be any one of manual, pneumatic, and spring-driven types.

The pressing portion of the stem may have a pressing surface form with a thinning portion in the center.

Advantageous Effect of the Invention

According to the valve device of the present invention, when the fluid pressure is high, only the flat surface of the sealing part comes in contact with the contact surface, so that the contact area between the sealing part and the contact surface decreases, which can secure sufficient sealing performance. In addition, since the sealing thrust decreases, the displacement of the sealing part of the rib in the lateral direction relative to the contact surface decreases, so that particles are less likely to be generated. In contrast, when fluid pressure is low, the inclined surfaces, in addition to the flat surface of the sealing part come into contact with the contact surface, which increases the contact area between the sealing part and the contact surface compared to the case of high fluid pressure. Therefore, the stress generated in the sealing part of the rib decreases and the deformation of the sealing part of the rib in the lateral direction relative to the contact surface is suppressed, thereby suppressing the generation of particles. In this way, fluctuations of the stress generated in the sealing part of the rib is reduced when the fluid pressure fluctuates, and the fluctuations of the displacement of the sealing part of the rib in the lateral direction relative to the contact surface is suppressed, thereby providing a stable, high-quality valve device with small fluctuations in the number of particles generated.

DESCRIPTION OF EMBODIMENTS

Figure 1:
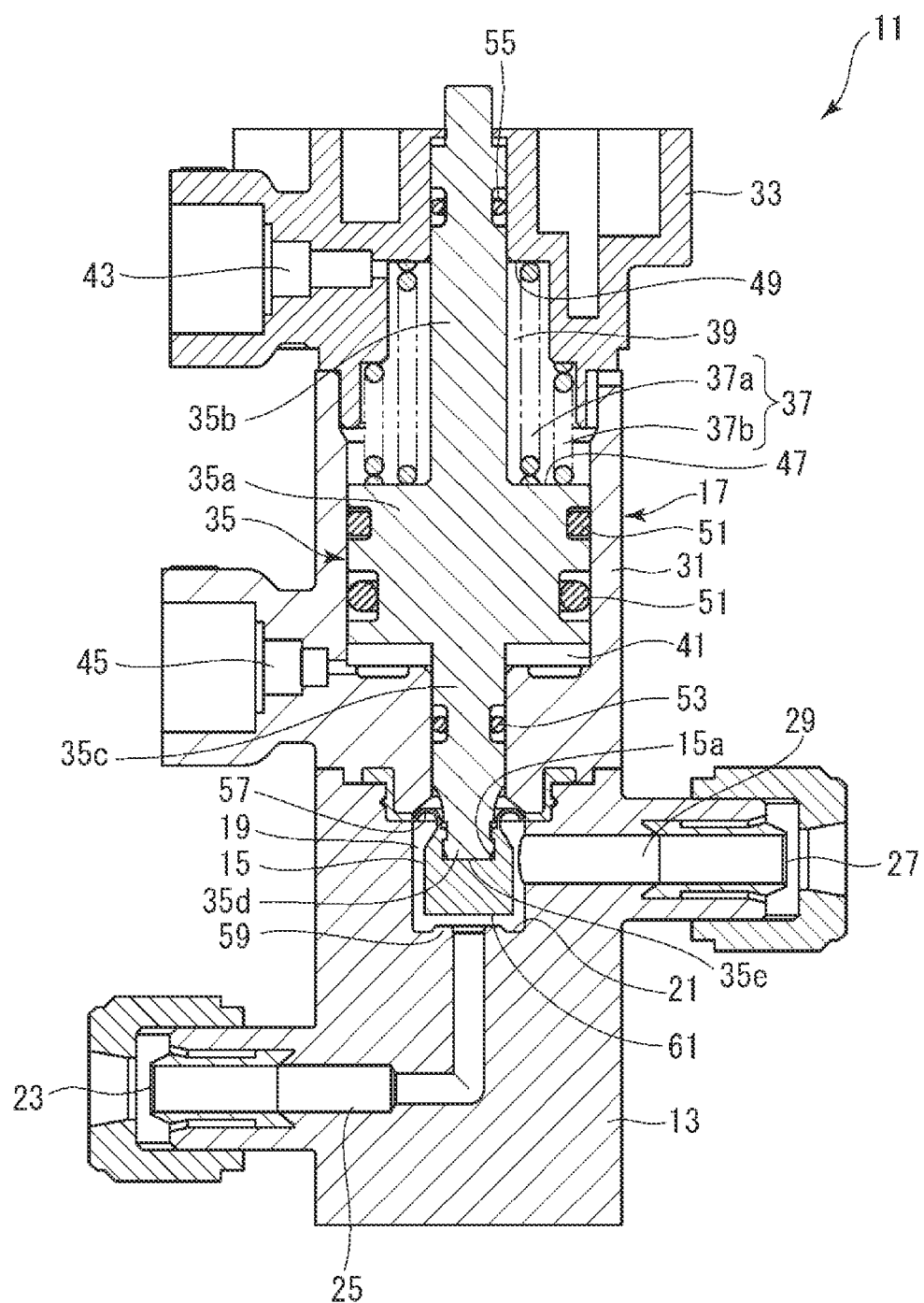
FIG. 1 is a vertical cross-sectional view showing a diaphragm valve in an opened state according to a first embodiment of a valve device of the present invention.

Embodiments of a valve device according to the present invention will be described below with reference to the drawings.

First, the overall configuration of a diaphragm valve 11 that is a first embodiment of the valve device will be described with reference to FIGS. 1 and 2.

The diaphragm valve 11 includes a valve main body 13, a valve element 15 and a drive unit 17 for driving the valve element 15. The drive unit 17 is attached to the upper part of the valve main body 13.

The valve main body 13 has a valve chamber 19 formed in the center of the upper part thereof, a first flow passage and a second flow passage which are formed to be in communication with the valve chamber 19, and an annular valve seat 21 which the valve element 15 comes in contact with and separates away from is formed in an area surrounding an opening from the first flow passage to the valve chamber 19. In the shown embodiment, there is formed as the first flow passage an inflow passage 25 extending from an inflow port 23, which is formed on one of the opposing side surfaces of the valve main body 13, and opening in the center of the bottom of the valve chamber 19. In addition, there is formed as the second flow passage an outflow passage 29 extending from an outflow port 27, which is formed on the other of the opposing side surfaces of the valve main body 13, and opening to the side surface of the valve chamber 19. The annular valve seat 21 is formed in the area surrounding the opening from the inflow passage 25 to the valve chamber 19.

The valve element 15 has a tapered upper end of a cone shape like a cylinder with a truncated cone coupled thereto, and is supported by the valve main body 13 so that the bottom end surface faces the valve seat 21.

The drive unit 17 includes: a cylinder body 31 attached to the upper part of the valve main body 13 and having a space of a cylinder part formed inside; a cover member 33 attached to the upper part of the cylinder body 31; a piston 35 housed in the cylinder part; and compression coil springs 37 (37a, 37b) serving as a biasing member.

The piston 35 has a piston body 35a slidably housed in the cylinder part of the cylinder body 31, a guide shaft 35b extending upward from the upper surface of the piston body 35a, and a stem 35c extending downward from the lower surface of the piston body 35a. The piston body 35a has an outer peripheral surface, which is in contact with the inner peripheral surface of the cylinder part so as to be slidable in the vertical direction, and divides the internal space of the cylinder part into an upper space 39 and a lower space 41. The upper space 39 is enclosed by the upper surface of the piston body 35a, the inner peripheral wall of the cylinder part, and the ceiling surface of the cylinder part (that is, the lower surface of the cover member 33), and the lower space 41 is enclosed by the lower surface of the piston body 35a, the inner peripheral wall of the cylinder part, and the bottom surface of the cylinder part (that is, the bottom of the cylinder body 31). The guide shaft 35b is slidably inserted into a through hole formed to extend through the cover member 33, thereby guiding the vertical movement of the piston 35. The stem 35c is slidably inserted into a through hole formed to extend through the bottom portion of the cylinder body 31 to the valve chamber 19, and has a connecting end 35d at the tip end thereof, to which the valve element 15 is connected.

In the present embodiment, the stem 35c is provided at a connecting end 35d thereof with a retainer having an enlarged diameter. Such a connecting end (retainer) 35d of the stem 35c is press-fitted into a connection hole 15a formed in the valve element 15 to connect the valve element 15 to the connecting end 35d of the stem 35c. However, the connection of the valve element 15 to the connecting end 35d of the stem 35c is not limited to press fitting. In another example, the connecting end 35d of the stem 35c is formed on the outer peripheral surface thereof with external threads and the connection hole is formed on the inner peripheral surface thereof with internal threads, so that the valve element 15 may be connected to the connecting end 35d of the stem 35c by screwed the external threads and the internal threads to each other.

The cover member 33 has formed therein a first communication port 43 being in communication with the ceiling surface of the cylinder part that defines the upper space 39, so that working fluid can be supplied to and discharged from the upper space 39 through the first communication port 43. The cylinder body 31 has formed therein a second communication port 45 being in communication with the bottom surface of the cylinder part that defines the lower space 41, so that working fluid can be supplied to and discharged from the lower space 41 through the second communication port 45. Spring seats 47 and 49 are formed on the upper surface of the piston body 35a and the lower surface of the cover member 33 (ceiling surface of the cylinder part), respectively, so that the compression coil springs 37 can be placed between the lower surface of the cover member 33 (ceiling surface of the cylinder part) and the upper surface of the piston body 35a.

The drive unit 17 is attached to the valve main body 13 so that the guide shaft 35b and the stem 35c of the piston 35 extend perpendicular to the valve seat surface. O-rings 51, 53 and 55 are attached to the outer peripheral surface of the piston body 35a, the outer peripheral surface of the stem 35c inserted into the through hole of the bottom of the cylinder body 31, and the outer peripheral surface of the guide shaft 35b, respectively. This can prevent the leakage of working fluid supplied to the lower space 41 and the upper space 39 through a gap between the outer peripheral surface of the piston body 35a and the inner peripheral surface of the cylinder, a gap between the outer peripheral surface of the stem 35c and the inner peripheral surface of the through hole at the bottom (bottom surface of the cylinder part) of the cylinder body 31, and a gap between the outer peripheral surface of the guide shaft 35b and the inner peripheral surface of the through hole of the cover member 33.

With this configuration, in the normal mode, the piston body 35a is biased and pushed downward by the compression coil springs 37, and accompanying with this, the valve element 15 connected to the piston body 35a via the stem 35c is moved downward to be pressed against the valve seat 21. Supplying working fluid (e.g., compressed air) to the upper space 39 of the cylinder part through the first communication port 43 can make a downward fluid pressure act on the upper surface of the piston body 35a to change the force acting on the valve element 15 via the stem 35c and thus adjust the force to press the valve element 15 against the valve seat 21. As a result of the valve element 15 being pressed against the valve seat 21, the inflow passage 25 is closed and the diaphragm valve 11 is in a closed state as shown in FIG. 2. Supplying working fluid (for example, compressed air) to the second communication port 45 from this state makes the working fluid flow into the lower space 41 of the cylinder part and an upward fluid pressure act on the lower surface of the piston body 35a to push up the piston body 35a against the biasing force of the compression coil springs 37 (in some cases, in addition to this, downward fluid pressure that the working fluid in the upper space 39 applies to the piston body 35a). At this time, the working fluid in the upper space 39 of the cylinder part is discharged to the outside through the first communication port 43. When the piston body 35a moves upward, the valve element 15, which is connected to the piston body 35a via the stem 35c, moves upward and separates away from the valve seat 21. As a result, the opening from the inflow passage 25 is opened and the diaphragm valve 11 is in an opened state as shown in FIG. 1. In the opened state, fluid flowing into the inflow passage 25 from the inflow port 23 of the diaphragm valve 11 passes through the valve chamber 19 and the outflow passage 29, and flows out to the outside through the outflow port 27.

In the diaphragm valve 11, the valve element 15 is provided with a diaphragm 57 extending radially outward from the outer peripheral portion of the upper end of the valve element 15, and the valve element 15 is supported by the valve main body 13 via the diaphragm 57. Specifically, as shown in detail in FIG. 2, the outer peripheral edge portion of the diaphragm 57 includes: an annular first horizontal support portion 57a located at the outermost edge portion thereof and extending in the horizontal direction; an annular vertical support portion 57b located inside the first horizontal support portion 57a and extending in the up and down direction (the vertical direction); and an annular second horizontal support portion 57c located inside the vertical support portion 57b and extending in the horizontal direction, and the valve main body 13 has a stepped portion at the upper opening of the valve chamber 19. When a protrusion 31a extending from the center of the bottom of the cylinder body 31 is inserted into the upper opening of the valve chamber 19 of the valve main body 13, the first horizontal support portion 57a is sandwiched between the bottom surface of the cylinder body 31 located outside the protrusion 31a and the upper surface of the valve main body 13 surrounding the upper opening of the valve chamber 19, the vertical support portion 57b is sandwiched between the outer peripheral surface of the protrusion 31a of the cylinder body 31 and the vertical surface of the stepped portion of the upper opening of the valve chamber 19 of the valve main body 13, and the second horizontal support portion 57c is sandwiched between the tip surface (bottom surface) of the protrusion 31a of the cylinder body 31 and the horizontal surface of the stepped portion of the upper opening of the valve chamber 19 of the valve main body 13, so that the diaphragm 57 is fixed to the valve main body 13. The vertical support portion 57b is provided on the outer surface thereof with an annular protrusion 57d having a semicircular cross section, and the valve main body 13 is provided, on the vertical surface of the stepped portion at the upper opening of the valve chamber 19 of the valve main body 13, with an annular groove 13a having a trapezoidal cross section. The annular protrusion 57d is formed to be slightly larger than the annular groove 13a, so that the annular protrusion 57d is deformed to be into close contact with the annular groove 13a for better sealing, when, while engaging the annular protrusion 57d on the outer surface of the vertical support portion 57b with the annular groove 13a on the vertical surface of the stepped portion at the upper opening of the valve chamber 19, the protrusion 31a of the cylinder body 31 is inserted into the valve chamber 19 of the valve main body 13 to attach the cylinder body 31 to the upper part of the valve main body 13.

In this embodiment, as described above, the diaphragm valve is provided on the vertical support portion 57b thereof with the annular protrusion 57d, which engages with the annular groove 13a at the stepped portion of the upper opening of the valve main body 13. However, the structure of the diaphragm valve 11 is not limited to the above configuration. For example, the vertical support portion 57b of the diaphragm 57 may be formed with an annular groove, which engages with an annular protrusion formed on the vertical surface of the stepped portion of the upper opening of the valve main body 13. Each of the first horizontal support portion 57a and the vertical support portion 57b may be formed with an annular protrusion or an annular groove, and each of the upper surface of the valve main body 13 surrounding the upper opening and the vertical surface of the stepped portion may be formed with an annular groove or an annular protrusion.

The valve main body 13, the valve element 15, the cylinder body 31, the piston 35, and the diaphragm 57 may be made of PVC (polyvinyl chloride resin), PVDF (polyvinylidene fluoride), PP (polypropylene), PTFE (polytetrafluoroethylene), PFA (perfluoroalkoxy alkane) or the like.

In the valve device according to the present invention, one of the valve seat 21 and the end face of the valve element 15 facing the valve seat 21 is provided with an annular rib 59 raised toward the other, and the other of the valve seat 21 and the end face of the valve element 15 is provided with an annular contact surface 61. The rib 59 has an annular sealing part 63 formed on the top thereof and coming in contact with the contact surface 61 to provide sealing between the end face of the valve element 15 and the valve seat 21, and has an inner side surface 65 and an outer side surface 67 provided on both of the inner and outer sides of the sealing part 63, respectively. The sealing part 63 includes an annular flat surface 63a extending in parallel with the contact surface 61, and annular inner inclined surface 63b and outer inclined surface 63c provided adjacent to the flat surface 63a on the inner and outer sides thereof, respectively, and inclined to the flat surface 63a so as to extend in a direction away from the contact surface 61. The sealing part 63 is configured so that only the flat surface 63a comes in contact with the contact surface 61 when the force to press the end face of the valve element 15 against the valve seat 21 (hereinafter referred to as a sealing thrust) is low, and so that the inner inclined surface 63b and outer inclined surface 63c come in contact the contact surface 61 in addition to the flat surface 63a due to the deformation of the valve element 15 and the rib 59 as the sealing thrust increases. Note that the angles that the inner side surface 65 and the outer side surface 67 form relative to the flat surface 63a in the direction away from the contact surface 61 are larger than the angles of the inner inclined surface 63b and the outer inclined surface 63c, respectively.

Figure 2:
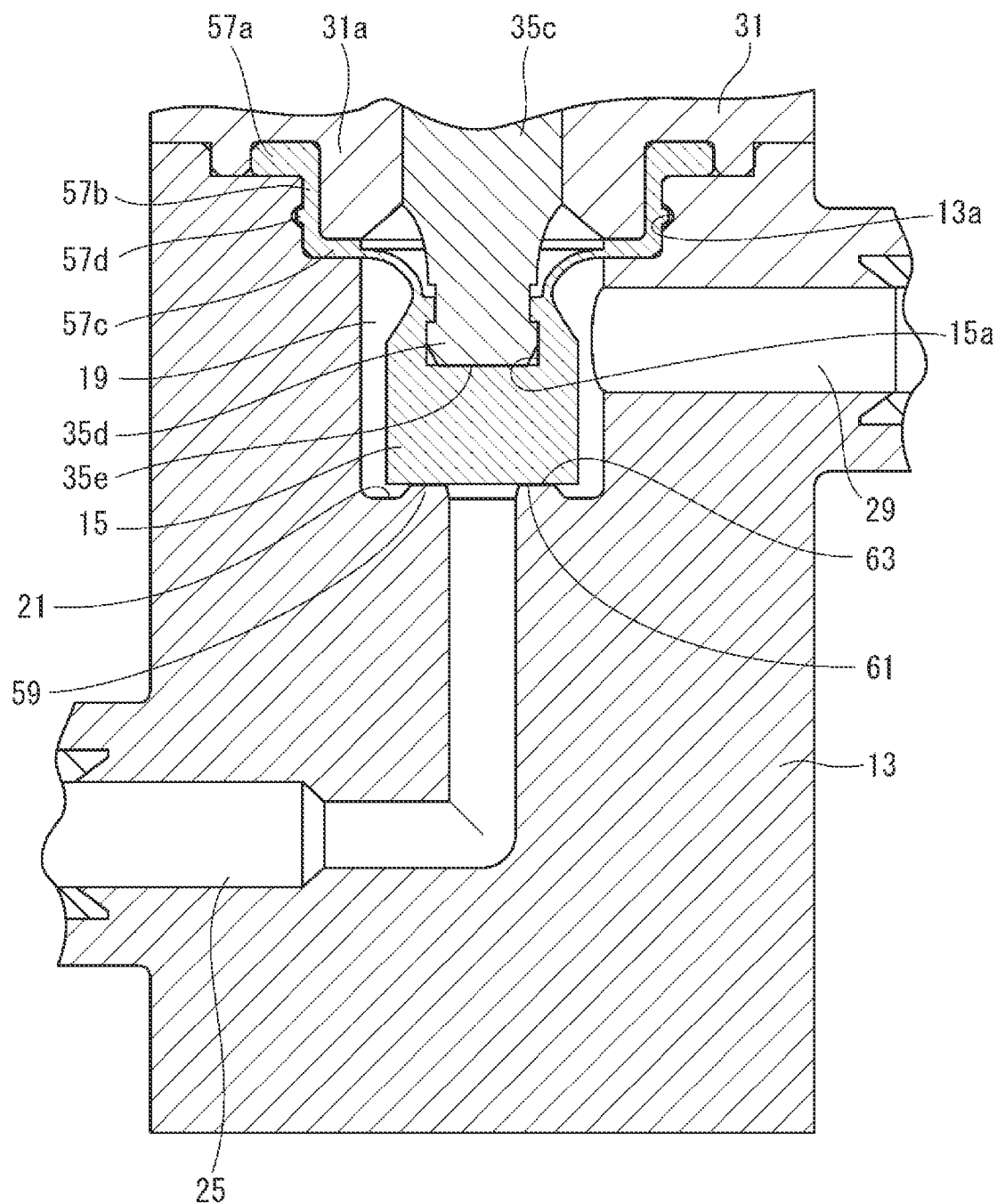
FIG. 2 is a vertical cross-sectional view showing the diaphragm valve shown in FIG. 1 in a closed state.
Figure 3:
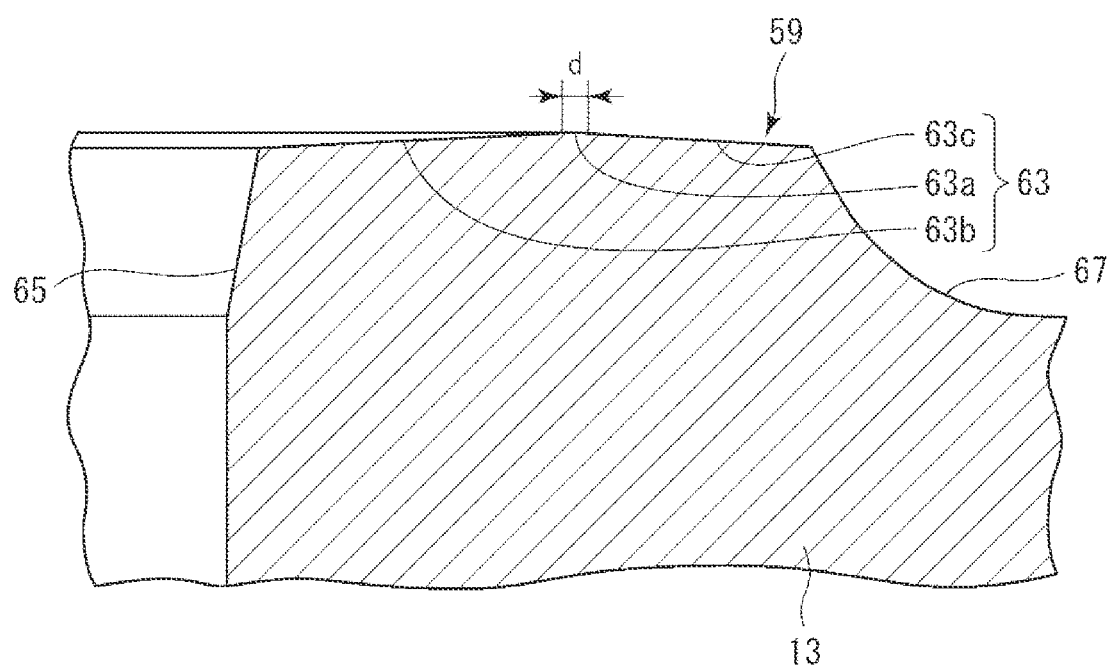
FIG. 3 is a partial enlarged cross-sectional view of the rib provided on the valve seat of the diaphragm valve shown in FIG. 1.
Figure 4:
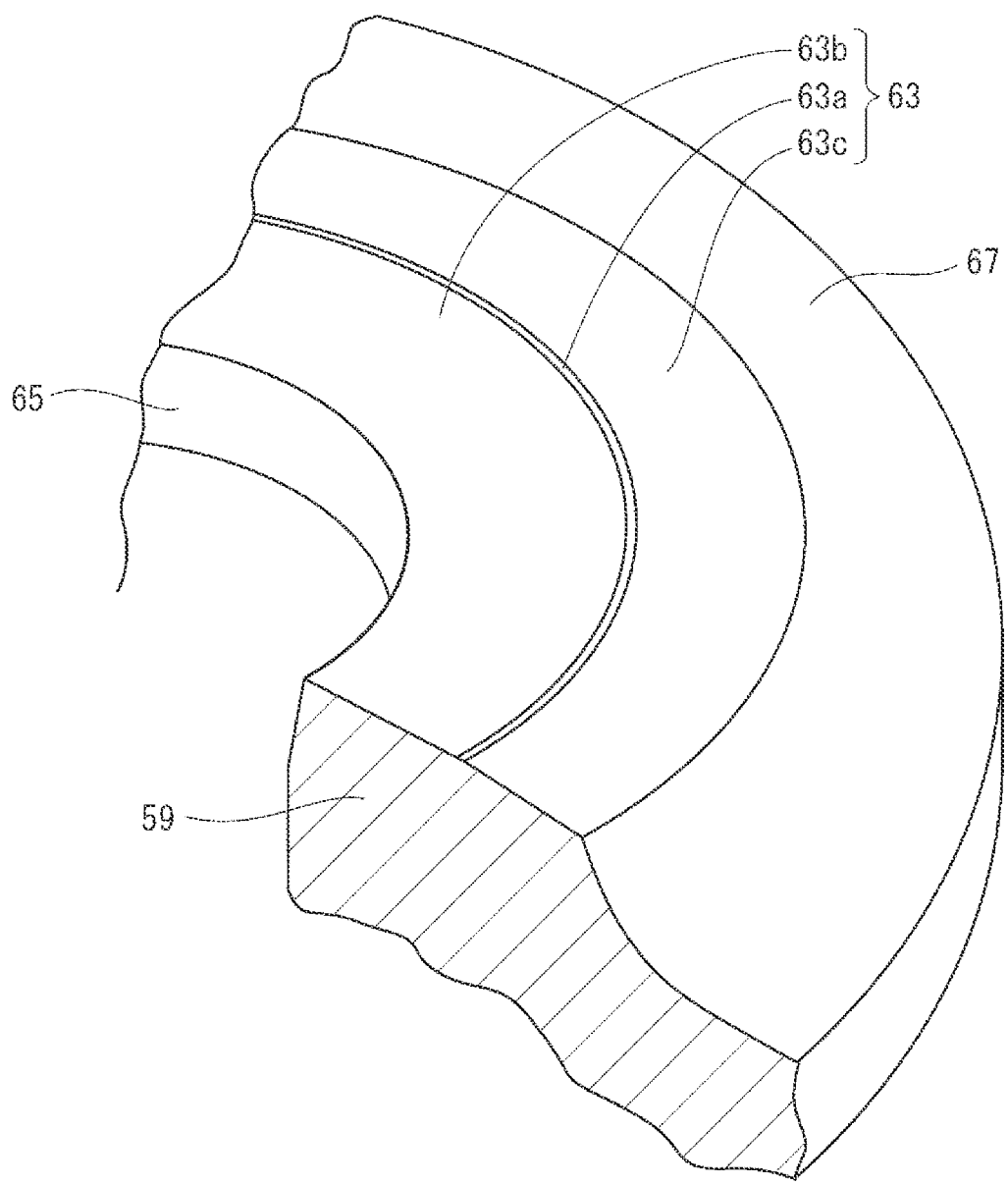
FIG. 4 is a partial enlarged perspective view of the rib provided on the valve seat of the diaphragm valve shown in FIG. 1.

As shown in details in FIGS. 3 and 4, in the diaphragm valve 11 shown in FIG. 1 that is the first embodiment of the valve device, the valve seat 21 is provided with the circular rib 59 raised toward the valve element 15, and the valve element 15 is provided on the end face thereof facing the valve seat 21 with the circular contact surface 61. The sealing part 63 provided on the top of the rib 59 includes the circular flat surface 63a extending in parallel with the contact surface 61, and the circular inner inclined surface 63b and outer inclined surface 63c provided adjacent to the flat surface 63a on both of the inner and outer sides, respectively, and inclined to the flat surface 63a so as to extend in a direction away from the contact surface 61.

The inner inclined surface 63b and the outer inclined surface 63c are inclined at gentle inclination angles relative to the flat surface 63a in the direction away from the contact surface 61 so as to facilitate switching between the state where one or both of the inner inclined surface 63b and the outer inclined surface 63c are in contact with the contact surface 61 and the state where both of the inner inclined surface 63b and the outer inclined surface 63c are not in contact with the contact surface 61, in response to the deformation of the valve element 15 and the rib 59 resulting from the fluctuations of the sealing thrust. These inclination angles are preferably in the range of 1° to 10° relative to the flat surface 63a in the direction away from the contact surface 61. This is because the inclination angle of 1° or less increases the difficulty of machining from the viewpoint of machining accuracy. When the inclination angle exceeds 10°, larger deformation of the rib 59 and of the valve element 15 in the vertical direction is required for a contact of the contact surface 61 with one or both of the inner inclined surface 63b and the outer inclined surface 63c. This makes it difficult to increase the contact area between the contact surface 61 and the sealing part 63. As will be described later, if the contact area between the contact surface 61 and the sealing part does not increase when the sealing trust increases, the stress generated in the rib 59 would increase and the rib will be laterally deformed more so that particles are likely to be generated due to friction between the rib 59 and the contact surface 61.

Further, the flat surface 63a has a narrow width d (length in the radial direction) in order to reduce the contact area between the contact surface 61 and the flat surface 63a for securing sufficient seal performance when only the flat surface 63a is in contact with the contact surface 61 at the time of low sealing thrust. Preferably, the width d is 0.04 times or less the outer diameter of the flat surface 63a. This is because, if the width d of the flat surface 63a exceeds 0.04 times the outer diameter of the flat surface 63a, the contact area between the contact surface 61 and the sealing part 63 becomes relatively large when only the flat surface 63a is in contact with the contact surface 61, so that the surface pressure decreases during sealing when the seal thrusting is low, making it difficult to secure sufficient sealing performance. This results in the need of increasing the size of the drive unit 17 to increase the sealing thrust in order to secure sufficient sealing performance.

Although the inner inclined surface 63b and the outer inclined surface 63c of the diaphragm valve 11 shown in FIGS. 3 and 4 are constituted by inclined flat surfaces, respectively, each of these surfaces may be constituted by a convex curved surface as long as they are inclined relative to the flat surface 63a in a direction away from the contact surface 61. The diaphragm valve 11 shown in FIGS. 3 and 4 is provided with the inner side surface 65 constituted by a flat surface and the outer side surface 67 constituted by a concave curved surface. However, the inner side surface 65 and the outer side surface 67 are not limited to these configurations. Both of the inner side surface 65 and the outer side surface 67 may be flat surfaces or may be concave curved surfaces.

Figure 5A:
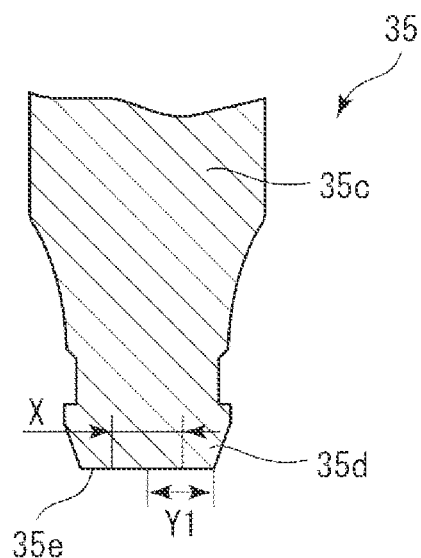
FIG. 5A is an explanatory diagram for explaining the average diameter of the pressing surface of the pressing portion of the stem, showing the example of a circular pressing surface of the pressing portion.
Figure 5B:
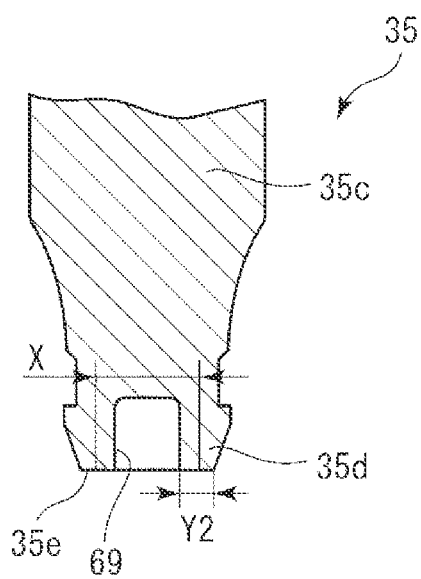
FIG. 5B is an explanatory diagram for explaining the average diameter of the pressing surface of the pressing portion of the stem, showing the example of an annular pressing surface of the pressing portion.

The connecting end 35d of the stem 35c serves as a pressing portion that exerts a force in the direction of pressing the valve element 15 against the valve seat 21 from the stem 35c to the valve element 15. In the embodiment shown in FIG. 1, the pressing portion is configured to be located inside the flat surface 63a of the sealing part 63 of the rib 59, as viewed in the direction of movement of the stem, i.e., in the direction perpendicular to the contact surface, as shown in FIGS. 5A and 5B. However, the pressing portion is not limited to the configuration shown in FIG. 1. In one example, the pressing portion may be configured to be located outside the flat surface 63a of the sealing part 63 of the rib 59 as viewed in the direction of movement of the stem 35c, i.e., in the direction perpendicular to the contact surface 61, or it may be configured to be located across the inner and outer sides of the flat surface 63a.

Preferably the outer diameter of the flat surface 63a of the rib 59 is in the range of 1 to 2 times the average diameter of the pressing surface of the pressing portion. If it is equivalent or less, the connecting end 35d of the stem 35c becomes large and the size of the entire valve becomes large. If it is 2 times or more, the valve element 15 is likely to deform to warp at the center part thereof, and the displacement in the lateral direction (in the direction parallel to the contact surface 61) of the rib 59 relative to the contact surface 61 also increases. This causes more particles generated due to the friction between the rib 59 and the contact surface 61. Note that the pressing surface average diameter of the pressing portion means the average of the inner and outer diameters of the pressing surface 35e, which is in the end face of the pressing portion facing the valve element 15 and comes in contact with the valve element 15 to exert a force on the valve element 15 in the direction of movement of the stem 35c. When the pressing surface 35e has a circular shape as in the first embodiment, this pressing surface average diameter is the diameter X of the circle connecting the center points of the radii Y1 of the pressing surface 35e as shown in FIG. 5A. When the pressing surface 35e is at the center thereof formed with a thinning portion (that is, a recess) 69 to be annular as in a variation of the first embodiment shown in FIG. 12 and described later, the pressing surface average diameter is the diameter X of the circle connecting the center points of the widths Y2 of the annular pressing surface 35e as shown in FIG. 5B.

Next, the operation of the diaphragm valve 11 shown in FIGS. 1 and 2 will be described.

During normal operation where no working fluid is supplied to the drive unit 17 from the second communication port 45, the piston body 35a of the drive unit 17 is biased downward by the compression coil springs 37 to be pushed downward. Consequently, the valve element 15 also moves downward with the piston body 35a via the stem 35c. As a result, the contact surface 61 of the end face of the valve element 15 close to the valve seat is pressed against the sealing part 63 of the rib 59 of the valve seat 21, so that the diaphragm valve 11 is closed as shown in FIG. 2. In order to increase the sealing thrust, working fluid is supplied from the first communication port 43 to the upper space 39 of the cylinder part of the drive unit 17 to let the fluid pressure of the working fluid flowing into the upper space 39 act downward on the upper surface of the piston body 35a in addition to the biasing force from the compression coil springs 37. This increases the force that presses or pushes the contact surface 61 of the valve element 15 against the sealing part 63 of the rib 59 of the valve seat 21 via the stem 35c.

By supplying working fluid to the second communication port 45 of the drive unit 17 after stopping the supply of working fluid from the first communication port 43, fluid pressure of the working fluid flowing into the lower space 41 of the cylinder part from the second communication port 45 acts upward on the piston body 35a to push up the piston body 35a against the biasing force of the compression coil springs 37 and the fluid pressure of the working fluid in the upper space 39. At this time, the working fluid in the upper space 39 is discharged to the outside through the first communication port 43. Pushing upward of the piston body 35a moves the valve element 15 upward via the stem 35c, and the contact surface 61 of the valve element 15 is separated from the sealing part 63 of the rib 59 of the valve seat 21 as shown in FIG. 1, so that the diaphragm valve 11 is in the opened state.

When the supply of working fluid to the second communication port 45 is stopped, the compression coil springs 37 bias and press the piston body 35a downward again, and the diaphragm valve 11 is in the closed state as described above.

In this way, the diaphragm valve 11 is configured so that supplying of working fluid to the first communication port 43 can change the force of the drive unit 17 pressing the valve element 15 against the valve seat 21 to adjust the sealing thrust. In the closed state, the pressure of the fluid in the inflow passage 25 acts on the end face of the valve element 15 that closes the opening formed on the bottom surface of the valve chamber 19 to push up the valve element 15. Therefore, even when the drive unit 17 keeps the force that presses the valve element 15 against the valve seat 21 constant, the sealing thrust fluctuates due to the fluctuation of the fluid pressure. Specifically, as the fluid pressure increases, the force to push up the valve element increases and the sealing thrust decreases. As the fluid pressure decreases, the force to push up the valve element decreases and the sealing thrust increases.

In the diaphragm valve 11, the sealing part 63 includes the circular flat surface 63a extending in parallel with the contact surface 61, and the inner inclined surface 63b and outer inclined surface 63c provided adjacent to the flat surface 63a on both sides and inclined to the flat surface 63a so as to extend in a direction away from the contact surface 61. With this configuration, when the sealing thrust acting on the valve element 15 is low, the contact surface 61 comes in contact with only the flat surface 63a of the sealing part 63, and as the sealing thrust increases, the contact surface 61 comes in contact with the inner inclined surface 63b and outer inclined surface 63c in addition to the flat surface 63a due to the deformation of the valve element 15 and the rib 59. In other words, the contact area between the contact surface 61 and the sealing part 63 changes with the fluctuations of the sealing thrust due to the factors described above.

Specifically, when the sealing thrust is low, the force that presses the contact surface 61 against the rib 59 is small, and the stress generated in the rib 59 (the force acting on the unit cross-sectional area) is also small. Therefore, the deformation of the rib 59 in the vertical direction (in the direction perpendicular to the contact surface) decreases and the contact surface 61 comes in contact with only the flat surface 63a, so that the contact area between the contact surface 61 and the sealing part 63 of the rib 59 is small. This can keep a certain contact pressure (surface pressure) even if the sealing thrust is low, and so secure sufficient sealing performance between the valve element 15 and the valve seat 21. When the sealing thrust is low, the force that presses the contact surface 61 against the rib 59 is small and the displacement in the lateral direction (in the direction parallel to the contact surface 61) relative to the contact surface 61 due to the deformation of the rib 59 also decreases. Therefore, particles are less likely to be generated. When the sealing thrust increases to be high, the force that presses the contact surface 61 against the rib 59 increases with the sealing thrust. Therefore, the deformation in the vertical direction due to the deformation of the rib 59 increases, and the deformation of the valve element 15 also increases. This makes the contact surface 61 come into contact with one or both of the inner inclined surface 63b and the outer inclined surface 63c in addition to the flat surface 63a, thus increasing the contact area between the contact surface 61 and the sealing part 63 of the rib 59. As a result, the stress generated in the rib 59 is small, so that the deformation of the rib 59 in the lateral direction is suppressed and the displacement of the sealing part 63 in the lateral direction relative to the contact surface 61 is also suppressed. This suppresses particles due to friction between the rib 59 and the contact surface 61. In this way, the present embodiment can suppress fluctuations in the number of particles due to fluctuations in sealing thrust.

Next, referring to FIG. 6 and FIGS. 7A to 7C, fluctuations of the contact area between the sealing part and the contact surface due to fluctuations of the sealing thrust will be described in more details.

Figure 6:
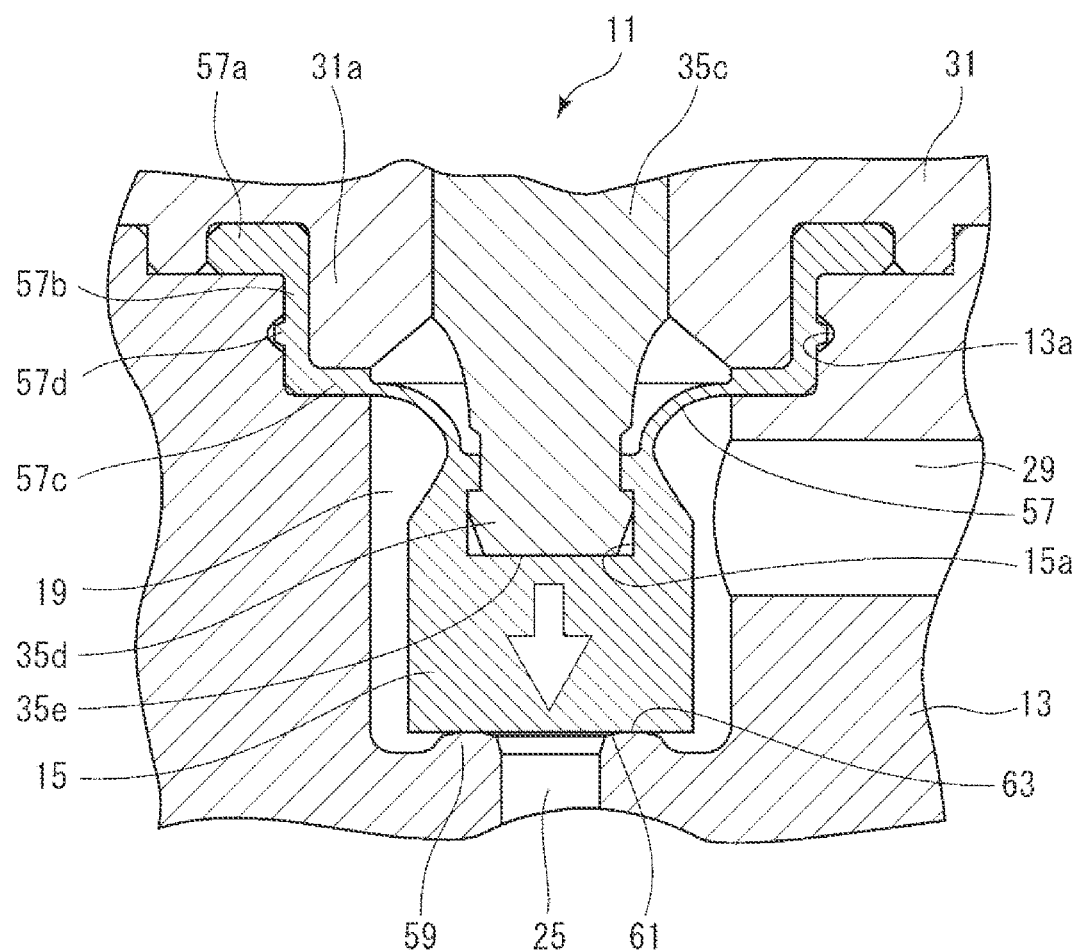
FIG. 6 is an explanatory diagram for explaining the action of the force from the pressing part of the stem to the valve element in the diaphragm valve shown in FIG. 1.
Figure 7A:
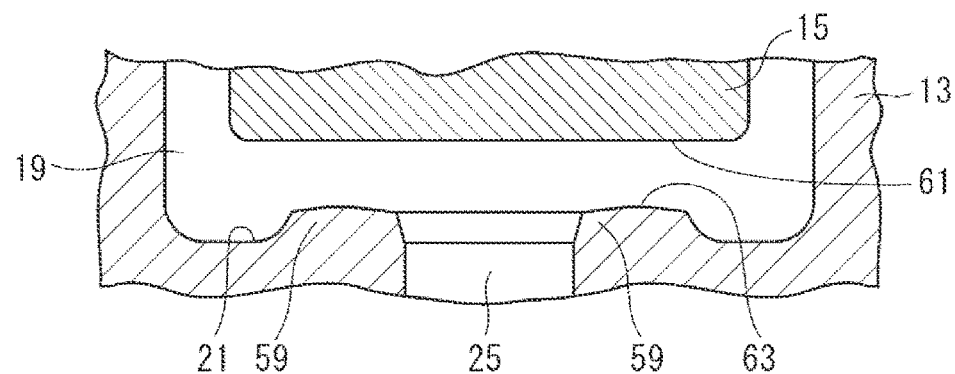
FIG. 7A is an explanatory diagram for explaining the deformation of the valve element in the diaphragm valve shown in FIG. 6 when the valve element is seated against the valve seat, showing the opened state.

As described above, when working fluid is supplied to the second communication port 45 in the state where the supply of working fluid through the first communication port 43 of the drive unit 17 is stopped, the contact surface 61 of the valve element 15 separates from the sealing part 63 of the rib 59 of the valve seat 21 as shown in FIG. 7A, so that the diaphragm valve 11 is in the opened state. When the supply of working fluid to the second communication port 45 is stopped from this state, the piston body 35a is biased and pushed downward again and the contact surface 61 of the valve element 15 is pressed against the sealing part 63 of the rib 59 of the valve seat 21 as shown in FIG. 6, so that the diaphragm valve 11 is in the closed state.

In the diaphragm valve 11 of the first embodiment, as shown in FIG. 6, the stem 35c is provided at the connecting end 35d thereof with a retainer, press-fitting of the connecting end 35d into the connection hole 15a formed in the valve element 15 connects the valve element 15 to the connecting end 35d of the stem 35c, and a force is applied to the valve element 15 from the stem 35c through the lower end face of the connecting end 35d. That is, the connecting end 35d serves as a pressing portion that presses the valve element 15 against the valve seat 21. In the diaphragm valve 11 of the first embodiment, the pressing portion is located inside the flat surface 63a of the circular rib 59 as viewed in the direction of movement of the stem 35c.

Figure 7B:
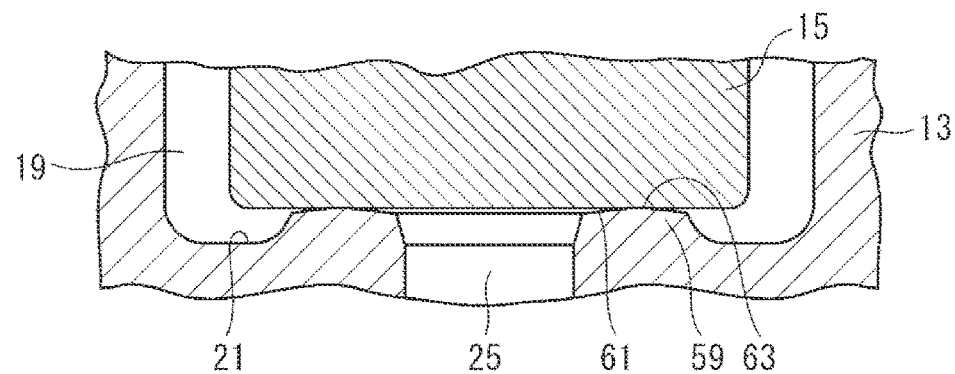
FIG. 7B is an explanatory diagram for explaining the deformation of the valve element in the diaphragm valve shown in FIG. 6 when the valve element is seated against the valve seat, showing the state when the sealing thrust is low.

When a force is applied to the valve element 15 from the drive unit 17 via the stem 35c, the diaphragm valve 11 having such a configuration operates as follows. When the sealing thrust is low, for example, when the supply of working fluid to the first communication port 43 is stopped or when the fluid pressure is high, the force that presses the contact surface 61 of the valve element 15 against the rib 59 of the valve seat 21 is small, so that the deformation of the rib 59 in the vertical direction decreases and the contact surface 61 thus comes in contact with only the flat surface 63a of the rib 59 as shown in FIG. 7B. Therefore, the contact area between the contact surface 61 and the sealing part 63 of the rib 59 decreases. This can keep a certain contact pressure (surface pressure) even if the sealing thrust is low, and secure sufficient sealing performance between the valve element 15 and the valve seat 21. When the sealing thrust is low, the displacement in the lateral direction relative to the contact surface 61 due to the deformation of the rib 59 also decreases, so that particles are less likely to be generated.

Figure 7C:
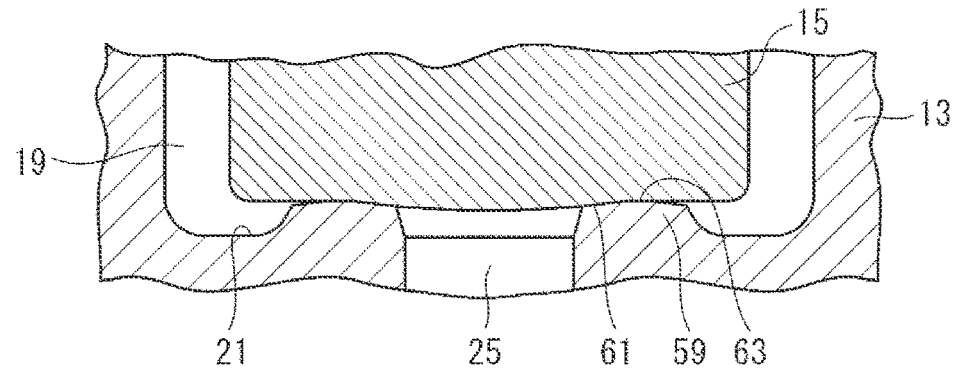
FIG. 7C is an explanatory diagram for explaining the deformation of the valve element in the diaphragm valve shown in FIG. 6 when the valve element is seated against the valve seat, showing the state when the sealing thrust is high.

In contrast, when the sealing thrust is high, for example, when the piston body 35a is pushed downward by the fluid pressure of the working fluid flowing into the upper space 39 from the first communication port 43 in addition to the biasing force of the compression coil springs 37 or when the fluid pressure is low, the force that presses the contact surface 61 of the valve element 15 against the rib 59 of the valve seat 21 is large, so that the deformation of the rib 59 in the vertical direction increases. Further, from the state where the contact surface 61 comes in contact with the annular flat surface 63a of the sealing part 63 of the rib 59, the valve element 15 is pushed downward by a stronger force from the pressing part (connecting end 35d) located inside the flat surface 63a as viewed in the direction of movement of the stem 35c, so that the central part of the valve element 15 is easily deformed into a convex shape toward the valve seat 21, as shown in FIG. 7C. As a result, the contact surface 61 comes into contact with the inner inclined surface 63b (when the sealing thrust is very high, also with at least a part of the outer inclined surface 63c) in addition to the flat surface 63a. Therefore, the contact area between the contact surface 61 and the sealing part 63 of the rib 59 increases, thus distributing the force. As a result, the stress generated in the rib 59 decreases, so that the deformation of the rib 59 in the lateral direction is suppressed and the displacement of the sealing part 63 in the lateral direction relative to the contact surface 61 is also suppressed. This suppresses particles due to friction between the rib 59 and the contact surface 61.

In this way, with the configuration of the sealing part 63 of the rib 59, the diaphragm valve 11 achieves the effect of suppressing fluctuations in the number of particles due to fluctuations in sealing thrust.

The operation of the diaphragm valve according to the present invention has been described above by way of an example of the diaphragm valve 11 configured so that the pressing portion is located inside the flat surface 63a of the circular rib 59 as viewed in the direction of movement of the stem 35c. However, the diaphragm valve configured so that the pressing portion is located outside the flat surface 63a of the circular rib 59 as viewed in the direction of movement of the stem 35c can also achieve a similar effect.

Figure 8:
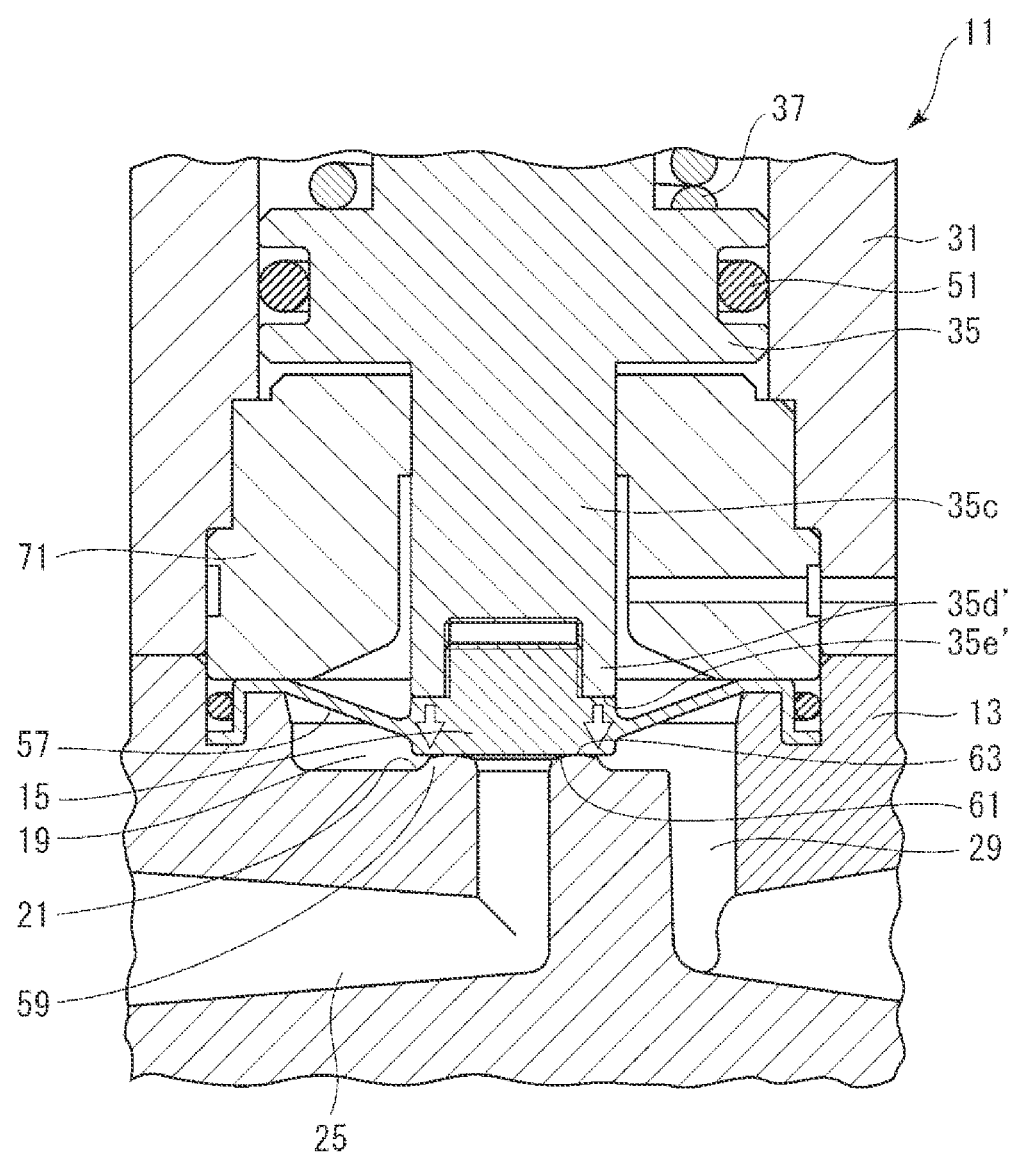
FIG. 8 is an explanatory diagram for explaining an action of a force from a pressing part of a stem to a valve element in a variation of the first embodiment of the diaphragm valve.

FIG. 8 illustrates an enlarged view of a different portion of a diaphragm valve 11' of a variation of the first embodiment from the diaphragm valve 11 of the first embodiment. In FIG. 8, the same components as those of the diaphragm valve 11 of the first embodiment shown in FIG. 1 are denoted by the same reference numerals. The configuration of the diaphragm valve 11' of the variation that is different from the diaphragm valve 11 of the first embodiment will be mainly described, and the descriptions on their common parts will be omitted.

The diaphragm valve 11' is the same as the diaphragm valve 11 in that: the diaphragm valve 11' includes a valve main body 13, a valve element 15 and a drive unit 17 for driving the valve element 15, and the drive unit 17 is attached to the upper part of the valve main body 13; the valve main body 13 has a valve chamber 19 formed in the center of the upper part thereof, and an inflow passage 25 and an outflow passage 29 formed therein and being in communicating with the valve chamber 19; and the valve main body 13 has an annular valve seat 21 formed in an area surrounding an opening from the inflow passage 25 to the valve chamber 19 so that the valve element 15 comes in contact with and separates away from the valve seat 21. On the other hand, the diaphragm valve 11' is different from the diaphragm valve 11 in that: the diaphragm valve 11 includes a diaphragm valve retainer 71 in place of the protrusion 31a for fixing the outer peripheral edge of the diaphragm 57 to the valve main body 13; and the stem 35c of the piston 35 has a connecting end 35d' located at the tip end thereof and the connecting end 35d' is provided at the center thereof with a fitting recess for a protrusion fitted therein which is provided at the top of the valve element 15. The valve element 15 is connected to the connecting end 35d' of the stem 35c by fitting the protrusion at the top of the valve element 15 into the fitting recess of the connecting end 35d' and by screwing, for example. The fitting recess of the connecting end 35d' is formed to have a diameter larger than the outer diameter of the flat surface 63a of the rib 59. With this configuration, the peripheral surface of the connecting end 35d' of the stem 35c, which surrounds the fitting recess, serves as a pressing surface 35e' of the pressing portion that exerts a force in the direction of pressing the valve element 15 against the valve seat 21 from the stem 35c to the valve element 15. That is, the pressing surface 35e' of the pressing portion is located outside the flat surface 63a of the circular rib 59 as viewed in the direction of movement of the stem 35c.

Figure 9A:
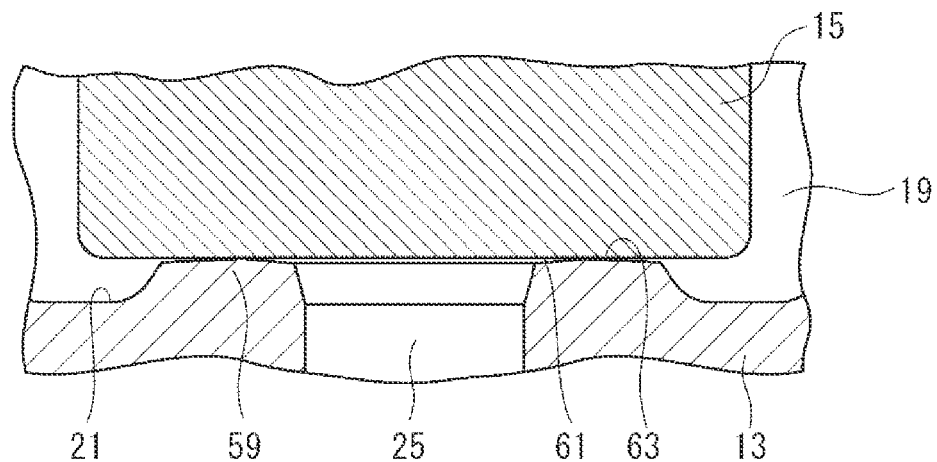
FIG. 9A is an explanatory diagram for explaining the deformation of the valve element in the diaphragm valve shown in FIG. 8 when the valve element is seated against the valve seat, showing the state when the sealing thrust is low.
Figure 9B:
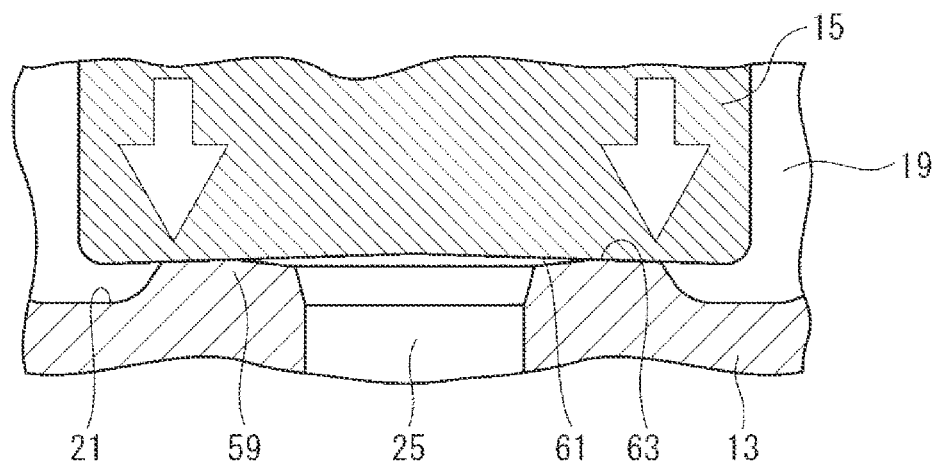
FIG. 9B is an explanatory diagram for explaining the deformation of the valve element in the diaphragm valve shown in FIG. 8 when the valve element is seated against the valve seat, showing the state when the sealing thrust is high.

Similarly to the diaphragm valve 11, in the diaphragm valve 11' described above, when the sealing thrust is low, the contact surface 61 comes in contact with only the flat surface 63a of the rib 59 as shown in FIG. 9A. Therefore, the contact area between the contact surface 61 and the sealing part 63 of the rib 59 decreases. This can keep a certain contact pressure (surface pressure) even if the sealing thrust is low, and so secure sufficient sealing performance between the valve element 15 and the valve seat 21. In contrast, when the sealing thrust is high, from the state where the contact surface 61 comes in contact with the annular flat surface 63a of the sealing part 63 of the rib 59, the valve element 15 is pushed downward by a stronger force from the pressing surface 35e' of the pressing part (connecting end 35d') located outside the flat surface 63 as viewed in the direction of movement of the stem 35c, so that the outer portion of the valve element 15 is pushed downward toward the valve seat 21 as shown in FIG. 9B, and is easily deformed into a concave shape as a whole. As a result, the contact surface 61 comes into contact with the outer inclined surface 63c (when the sealing thrust is very high, also with at least a part of the inner inclined surface 63b) in addition to the flat surface 63a. Therefore, the contact area between the contact surface 61 and the sealing part 63 of the rib 59 increases, thus distributing the force. As a result, the stress generated in the rib 59 decreases, so that the deformation of the rib 59 in the lateral direction is suppressed and the displacement of the sealing part 63 in the lateral direction relative to the contact surface 61 is also suppressed. This suppresses particles due to friction between the rib 59 and the contact surface 61. In this way, similarly to the diaphragm valve 11, the diaphragm valve 11' achieves the effect of suppressing fluctuations in the number of particles due to fluctuations in sealing thrust.

Next, another embodiments of the valve device according to the present invention will be described.

Figure 10:
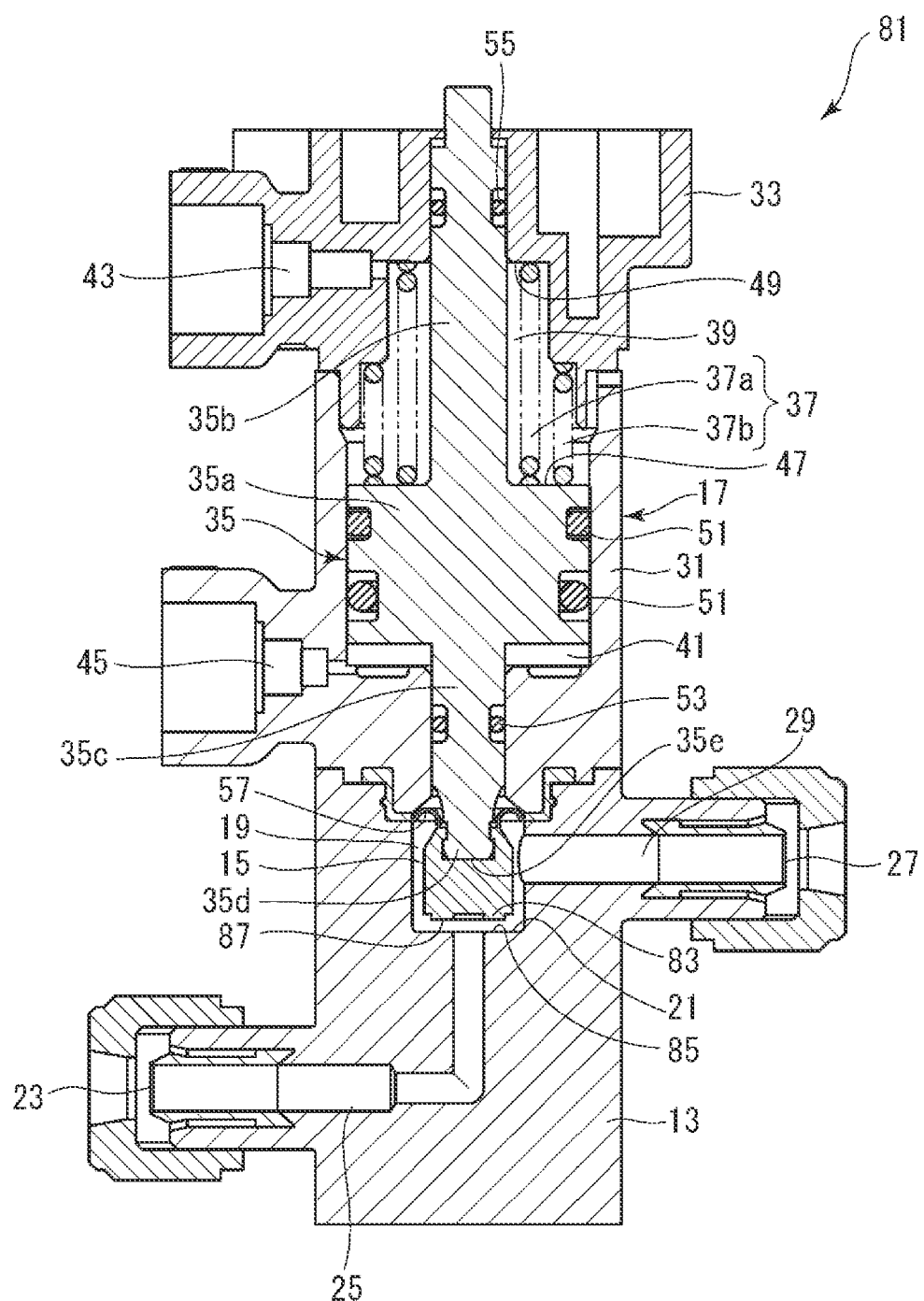
FIG. 10 is a vertical cross-sectional view showing a diaphragm valve according to a second embodiment of the valve device of the present invention in an opened state.
Figure 11:
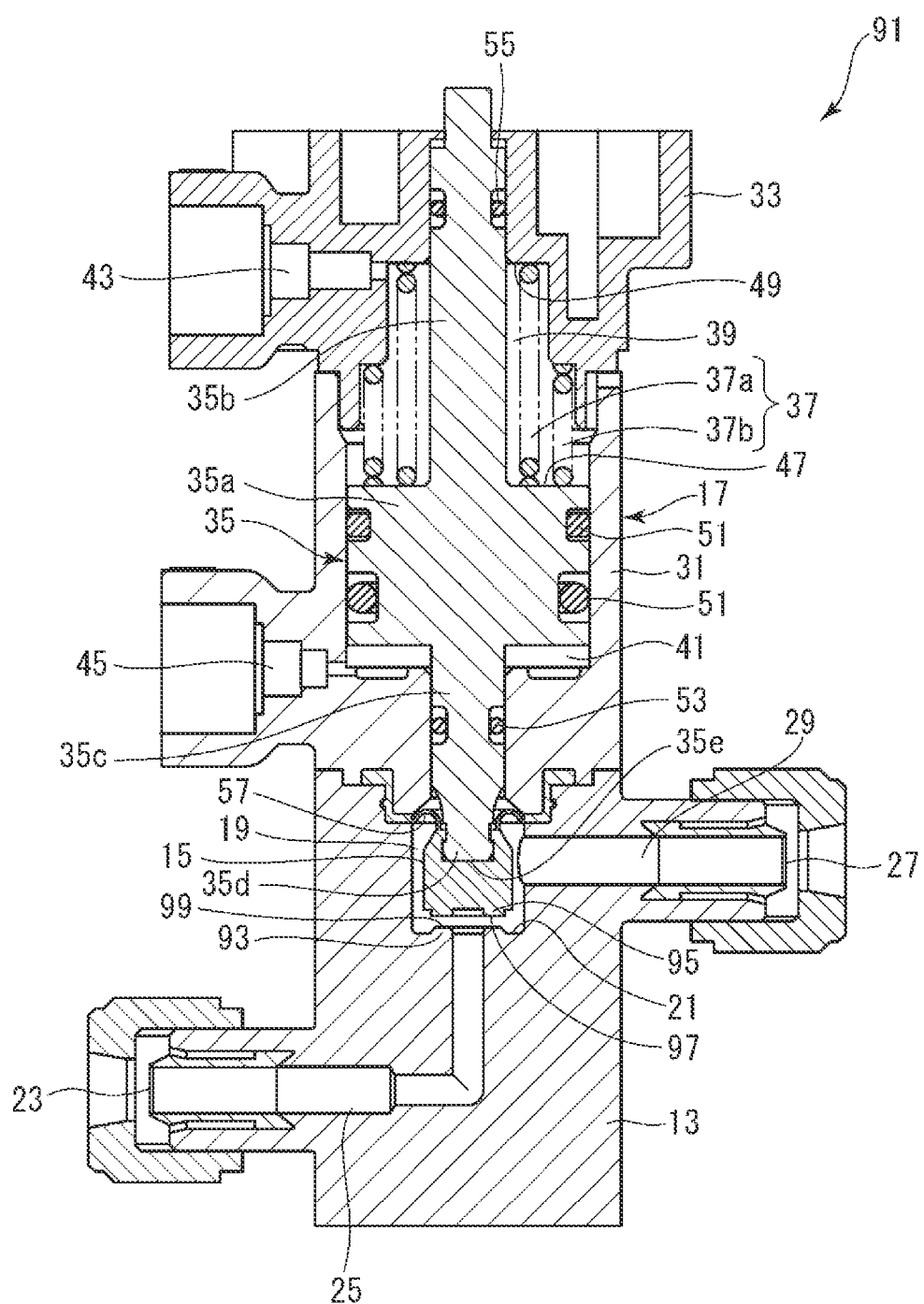
FIG. 11 is a vertical cross-sectional view showing a diaphragm valve according to a third embodiment of the valve device of the present invention in an opened state.

FIG. 10 illustrates a vertical cross-sectional view showing a diaphragm valve 81 according to a second embodiment of the valve device of the present invention in an opened state, and FIG. 11 illustrates a vertical cross-sectional view showing a diaphragm valve 91 according to a third embodiment of the valve device of the present invention in an opened state. In FIGS. 10 and 11, components similar to those of the first embodiment are denoted by the same reference numeral. The structures of the diaphragm valve 81 of the second embodiment and the diaphragm valve 91 of the third embodiment are the same as the structure of the diaphragm valve 11 of the first embodiment except for the place of the rib. Therefore, the place of the rib will be mainly described below.

Each of the diaphragm valve 81 and the diaphragm valve 91 includes a valve main body 13, a valve element 15 and a drive unit 17 for driving the valve element 15, and the drive unit 17 is attached to the upper part of the valve main body 13. The valve main body 13 has a valve chamber 19 formed in the center of the upper part thereof, and further has an inflow passage 25 extending from an inflow port 23, which is formed on one of the opposing side surfaces of the valve main body 13, and opening in the center of the bottom of the valve chamber 19, and an outflow passage 29 extending from an outflow port 27, which is formed on the other of the opposing side surfaces of the valve main body 13, and opening in the center of the bottom of the valve chamber 19. There is an annular valve seat 21 formed in an area surrounding the opening from the inflow passage 25 to the valve chamber 19, and the valve element 15 comes in contact with and separates away from the valve seat 21. The constitution of the drive unit 17 of each of the diaphragm valve 81 and the diaphragm valve 91 is the same as that of the drive unit 17 of the diaphragm valve 11, and so the descriptions thereof will be omitted.

In the diaphragm valve 11, the valve seat 21 is provided with the circular rib 59 raised toward the valve element 15, and the valve element 15 is provided on the end face thereof facing the valve seat 21 with the circular contact surface 61. The rib 59 is provided on the top thereof with a sealing part 63, which includes the circular flat surface 63a extending in parallel with the contact surface 61, and the circular inner inclined surface 63b and outer inclined surface 63c provided adjacent to the flat surface 63a on both of the inner and outer sides, respectively, and inclined to to the flat surface 63a so as to extend in a direction away from the contact surface 61.

In contrast, in the diaphragm valve 81, the valve element 15 is provided on the end face (bottom surface) thereof facing the valve seat 21 with a circular rib 83 raised toward the valve seat 21, and the valve seat 21 is formed, at a part thereof facing the rib 83, with a contact surface 85. The rib 83 is provided on the top thereof with a sealing part 87, which includes a circular flat surface extending in parallel with the contact surface 85, and circular inner and outer inclined surfaces provided adjacent to the flat surface on both of the inner and outer sides, respectively, and inclined to the flat surface so as to extend in a direction away from the contact surface 85.

Similarly to the action of the diaphragm valve 11, in the diaphragm valve 81, when the sealing thrust is low, the contact surface 85 comes in contact with only the flat surface of the rib 83, so that the contact area between the contact surface 85 and the sealing part 87 of the rib 83 decreases. When the sealing thrust is high, the contact surface 85 comes in contact with at least a part of the inner and outer inclined surfaces in addition to the flat surface of the rib 83, so that the contact area between the sealing part 87 of the rib 83 and the contact surface 85 increases. Therefore, the diaphragm valve 81 can achieve the same effect as the diaphragm valve 11.

In the diaphragm valve 91, the valve seat 21 is provided with a circular rib 93 raised toward the valve element 15, and the valve element 15 is provided on the end face (bottom surface) thereof facing the valve seat 21 with a circular rib 95 raised toward the valve seat 21. The rib 93 and the rib 95 are provided on the tops thereof with sealing parts 97 and 99, respectively, each of which includes a circular flat surface extending in parallel with the valve seat 21, and circular inner and outer inclined surfaces provided adjacent to the flat surface on both of the inner and outer sides, respectively, and inclined to the flat surface so as extend in a direction away from the corresponding rib 93 or 95. In the diaphragm valve 91, one of the sealing parts 97 and 99 of the ribs 93 and 95 also serves as the contact surface of the other sealing part 99 or 97.

Similarly to the action of the diaphragm valve 11, in the diaphragm valve 91, when the sealing thrust is low, the flat surface of the rib 95, that is the contact surface, comes in contact with only the flat surface of the rib 93, so that the contact area between the sealing part 97 of the rib 93 and the sealing part 99 of the rib 95 decreases. When the sealing thrust is high, the sealing part 99 of the rib 95 comes in contact with at least a part of the inner and outer inclines surfaces in addition to the flat surface of the sealing part 97 of the rib 93, so that the contact area between the sealing part 97 of the rib 93 and the sealing part 99 of the rib 95 increases. Therefore, the diaphragm valve 91 can achieve the same effect as the diaphragm valve 11.

Figure 12:
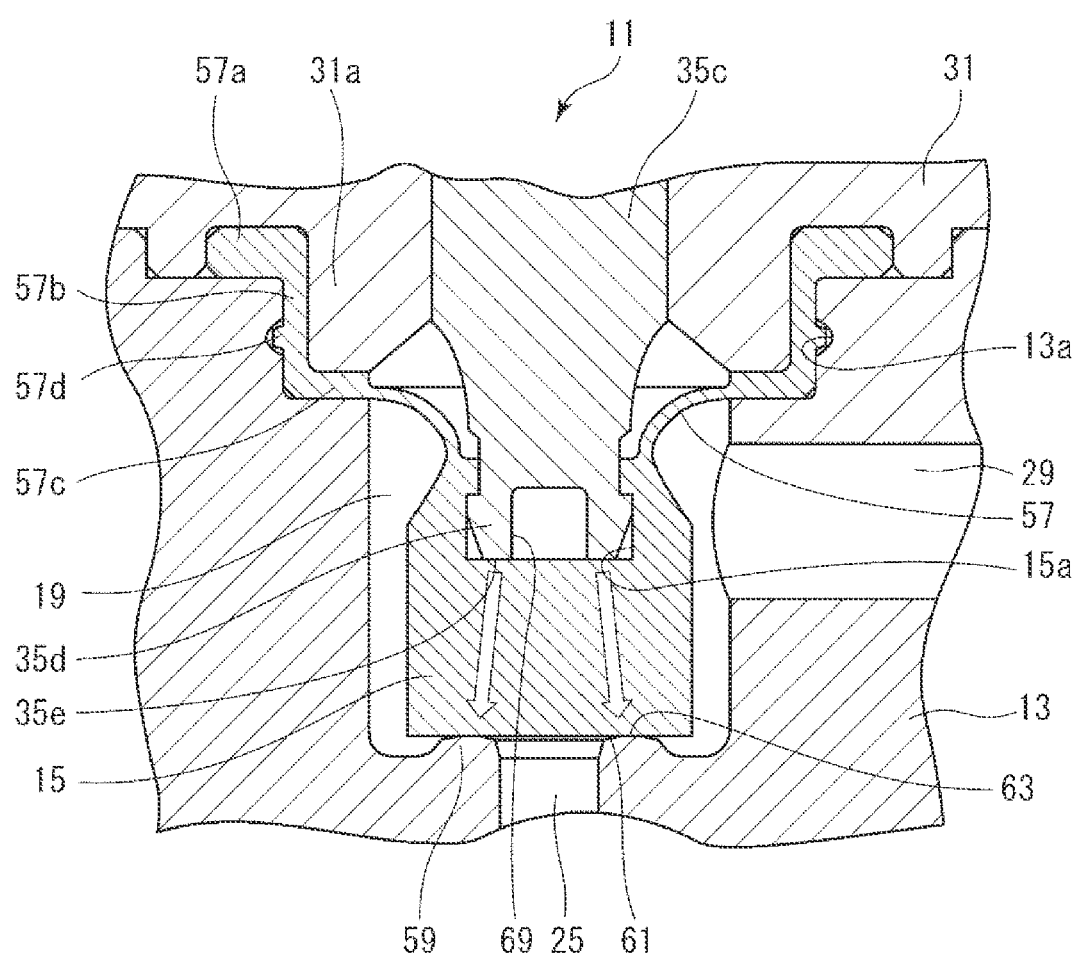
FIG. 12 is an explanatory diagram illustrating an enlarged view of a pressing portion of a stem in a diaphragm valve according to another variation of the first embodiment.

The present invention has been described above with reference to the embodiments shown in the figures. However, the present invention is not limited to the shown embodiments. For example, in the shown embodiments, the diaphragm valve is shown as an example of the valve device. However, the present invention is applicable to a valve of a type in which the opening of the inflow passage to the valve chamber is closed by a valve element, and is also applicable to, for example, a globe valve. Although the pressing surface 35e of the pressing portion is circular in the first, second, and third embodiments, the pressing surface 35e may has a thinning portion 69 formed in the center thereof to be annular (ring-shaped), as shown in FIG. 12. With such a shape, the pressing surface 35e of the pressing portion of the stem 35c presses the valve element 15, concentrating on the part of the valve element 15 near the inner inclined surface 63b and outer inclined surface 63c of the sealing part 63 of the rib 59, thus securing sufficient sealing performance even with low sealing thrust. Further, such a shape allows the tip of the stem 35*c* to be inserted into the diaphragm 57 with a small force for easy assembly, and unnecessary force is not applied to the contact surface 61 of the diaphragm 57, so that the generation of particles is suppressed.

DESCRIPTION OF REFERENCE NUMERALS

11 Diaphragm valve
13 Valve main body
15 Valve element
17 Drive unit
19 Valve chamber
21 Valve seat
25 Inflow passage
29 Outflow passage
57 Diaphragm
59 Rib
61 Contact surface
63 Sealing part
63*a* Flat surface
63*b* Inner inclined surface
63*c* Outer inclined surface
81 Diaphragm valve
83 Rib
85 Contact surface
87 Sealing part
91 Diaphragm valve
93 Rib
95 Rib
97 Sealing part
99 Sealing part

The invention claimed is:

1. A valve device comprising:
a valve main body having formed therein a valve chamber and first and second flow passages being in communication with the valve chamber; an annular valve seat formed in an area surrounding an opening from the first flow passage to the valve chamber; and a valve element having an end face facing the valve seat, said valve element being moved by a drive unit to come in contact with and separate away from the valve seat,
wherein one of the valve seat and the end face of the valve element is provided with a contact surface, and the other of the valve seat and the end face of the valve element is provided with an annular raised rib, said rib having at a top thereof an annular sealing part coming in contact with the contact surface to provide sealing between the end face of the valve element and the valve seat, said sealing part including an annular flat surface extending in parallel with the contact surface, and two annular inclined surfaces provided adjacent to the flat surface on both sides and inclined to the flat surface so as to extend in a direction away from the contact surface, said inclined surfaces in addition to the flat surface coming in contact with the contact surface as a force of pressing the valve element against the valve seat increases, and
wherein each of the inclined surfaces extends at an angle of inclination ranging from 1° to 10° relative to the flat surface in the direction away from the contact surface.

2. The valve device according to claim 1, wherein the rib is disposed on the valve seat, and the contact surface is disposed on the end face of the valve element.

3. The valve device according to claim 1, wherein each of the inclined surfaces comprises a flat surface.

4. The valve device according to claim 1, wherein the valve element is connected to a tip end of a stem which is driven by the drive unit and moves in a direction of moving toward and away from the valve seat, said stem having a pressing portion at the tip end thereof and exerting a force to press the valve element against the valve seat through the pressing portion.

5. The valve device according to claim 4, wherein the pressing portion is located inside the flat surface of the sealing part as viewed in a direction of movement of the stem.

6. The valve device according to claim 4, wherein the pressing portion is located outside the flat surface of the sealing part as viewed in a direction of movement of the stem.

7. The valve device according to claim 4, wherein the pressing portion of the stem has a pressing surface formed with a thinning portion in the center.

8. The valve device according to claim 1, wherein the valve device further comprises a diaphragm extending radially outward from the outer periphery of the valve element, and the valve element is supported by the valve main body via the diaphragm.

9. The valve device according to claim 1, wherein the drive unit is any one of manual, pneumatic, and spring-driven types.

* * * * *